Dec. 25, 1934.  T. S. HENNEBERGER  1,985,348

METHOD OF LOCATING CABLE SHEATH DEFECTS

Filed Dec. 30, 1931

INVENTOR
T. C. Henneberger
BY
ATTORNEY

Patented Dec. 25, 1934

1,985,348

UNITED STATES PATENT OFFICE 1,985,348

METHOD OF LOCATING CABLE SHEATH DEFECTS

Thomas C. Henneberger, Caldwell, N. J., assignor to American Telephone and Telegraph Company, a corporation of New York Application December 30, 1931, Serial No. 583,992

5 Claims. (Cl. 137—77)

This invention relates to the testing of cables, and more particularly to methods of locating defects in the sheath of a cable.

The invention contemplates the testing of cables by gas pressure. In general, when a gas leak such as one caused by a sheath defect occurs on a cable which is subject to gas pressure tests, it is the practice to make pressure readings at valves which have been installed at intervals along the cable; the lowest pressure indicates the point which is the approximate location of the leak. In the case of aerial cable it is a simple matter to determine the exact location of the leak by inspection of the sheath within the limits of the section thus determined. In the case of underground cable, however, the only parts of the cable which are open to inspection are those lying in the manholes. If the steps outlined above indicate that the leak is between manholes, it has been the practice heretofore to isolate the one or more manhole sections under consideration by means of gas-tight plugs placed in cable sleeves in the manholes. Each isolated section is then filled with gas and the section which has the greatest loss of gas is indicated as the defective section.

The object of the present invention is to determine the exact location of a cable sheath defect, through which gas is escaping from a cable under gas pressure test, in a case such as that of an underground cable in which the greater part of the cable is inaccessible.

The principal advantage found in the practice of this invention is that the defect can be repaired after digging down to the cable at the proper point, whereas heretofore it has been necessary to pull out the defective section of the cable and replace it.

In general, the methods of the invention are based on the fact that for a given rate of gas flow in a cable the pressure drop per unit length of cable is constant.

The invention will be clearly understood when the following description is read with reference to the accompanying drawing.

Figure 1 of the drawing indicates schematically the introduction of gas and the reading of pressures employed in the practice of the applicant's methods.

Figure 1:
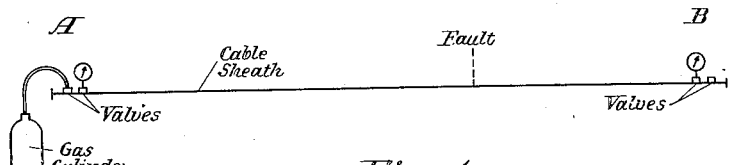

The first of the two methods to be described herein may be termed the single section method. It will be understood that it has been determined, in the manner outlined hereinabove, that the sheath of an underground cable is defective so as to permit the leakage of gas at some point between two consecutive manhole points A and B. Gas-tight plugs are placed at points A and B, and the section A to B is thus isolated. Two valves are installed at each end of the section A to B in a manner well understood in the art. A gauge for reading the pressure within the cable is applied to one of the valves at each end of the cable section. Gas is admitted to the plugged cable section at one end, A for instance, through the application of a gas cylinder as indicated in Fig. 1. After a certain length of time, ten to thirty minutes for the usual section lengths, the pressure gradient of the section A to B will reach equilibrium; in other words, the pressure along the plugged section will reach a steady state. The pressures in the cable at ends A and B, respectively, are now read on the gauges. Let the difference between these two pressures be called $P_a$. It will be understood that until these readings have been taken the gas cylinder remains connected and the introduction pressure of the gas is maintained. The gas cylinder is now disconnected from the end A and, preferably, the gas is allowed to escape from the section. The next step is to admit gas at end B of the section and to adjust the admission pressure so that after the pressure in the section has reached a steady state the pressure in the cable at end A is the pressure which was read at end B upon the first gas introduction. With this condition met the pressure in the cable at end B is read on the gauge, the adjusted introduction pressure having been maintained. Now let the difference between the pressures in the cable at ends B and A upon this second introduction be called $P_b$. If L represents the total length of the cable section under test A to B, and $x$ represents the length of cable between end A and the defect, which is to be determined, $$x = \frac{LP_a}{P_a + P_b}.$$

Figure 2:
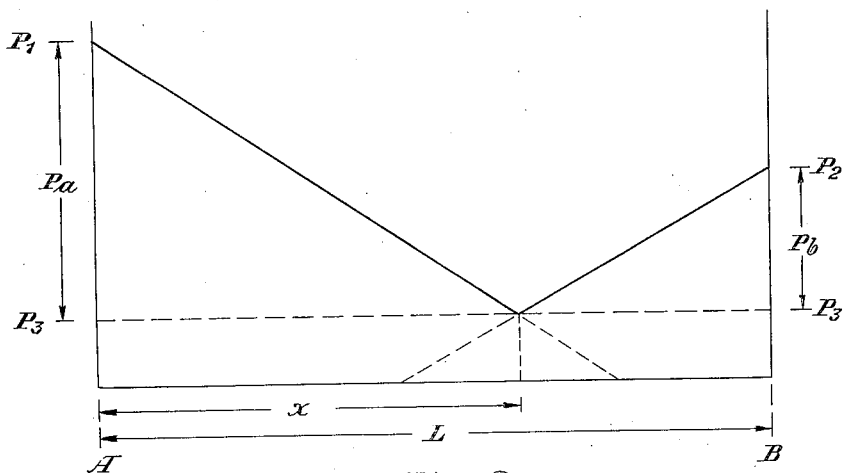
Fig. 2 is a graph helping to clarify the first of the applicant's two methods.

The theory of the above described method will be understood from an examination of the graph of Fig. 2. Let $P_1$ be the pressure in the cable at end A and let $P_3$ be the pressure in the cable at end B upon the first introduction of the gas at end A. Let $P_2$ and $P_3$ be the pressures in the cable at ends B and A, respectively, upon the introduction of the gas at end B. When the pressure along the section A to B has reached the steady state in the case of either introduction of the gas, there is no flow of gas beyond the defect, and, accordingly, in either case $P_3$ represents the pressure drop through the defect. Since, in accordance with the method stated above, $P_3$ is the same for the two tests, it follows that the amount of gas escaping through the defect is the same for the two cases, and, therefore, the rate of flow of the gas through the cable is the same for the two tests.

When gas is admitted at end A the pressure drop per unit length of cable in that part of the section represented by $x$ is $$\frac{P_1-P_3}{x}$$

or $$\frac{P_a}{x}.$$

When gas is admitted at end B the pressure drop per unit length over the part of the section $L-x$ is $$\frac{P_2-P_3}{L-x}$$

or $$\frac{P_b}{L-x}.$$

Since it is known that the pressure drop per unit length is the same for the two tests, we have $$\frac{P_a}{x}=\frac{P_b}{L-x}.$$

solving, $$P_b x = LP_a - P_a x$$
$$P_b x + P_a x = LP_a$$
$$x(P_b + P_a) = LP_a$$
$$x = \frac{LP_a}{P_a + P_b}.$$

The second of the applicant's methods may be termed the two-section method. It will be evident that this method is applicable especially in the cases in which it has been determined, by the preliminary steps outlined above, that a sheath defect is at some point between two or more non-consecutive manholes. For the purpose of this discussion it will be understood that A and B represent two manhole points between which there is an accessible part of the cable, such as that passing through the intermediate manhole or one of the intermediate manholes. In accordance with this method, gas is admitted at only one end, for instance A, of the section A to B, which, of course, has been isolated by gas-tight plugs as indicated above in connection with the first method. After the pressure in the cable section has reached a steady state, readings of the pressures in the cable are taken at points A and B and at some point C between A and the defect, the admission pressure, of course, being maintained. It should be stated at this point that the question as to which end of the section A to B should be the end of the gas introduction, is readily answered in accordance with the information given above. If, upon the introduction of the gas at one end of the section, it is found that the pressure readings in the cable at the far end and at the point C are the same, it is known that the intermediate point C is beyond the defect and that the method requires the introduction of gas at the opposite end of the section.

The pressures within the cable, which are read as indicated above after the pressure along the section has reached the steady state, are designated as $P_1$ for point A, $P_2$ for point C and $P_3$ for point B. Let M be the cable length between end A and the point C, and let $x$ represent the distance between the point C and the defect, which is to be determined. Then $$x=\frac{M(P_2-P_3)}{P_1-P_2}.$$

Figure 3:
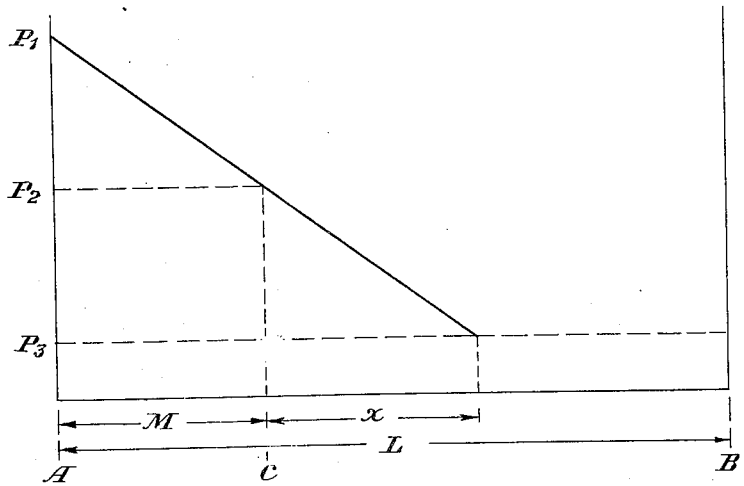
Fig. 3 is a second graph helping to clarify the second of the applicant's methods.

The theory of this second method will be clear from an examination of the graph of Fig. 3. The pressure drop per unit length in the part of the section M will be $$\frac{P_1-P_2}{M}.$$

Likewise, the pressure drop per unit length in the part of the cable section $x$ is $$\frac{P_2-P_3}{x}.$$

Since it is known that the pressure drop per unit length is constant, and that these two drops are therefore equal, we have $$\frac{P_1-P_2}{M}=\frac{P_2-P_3}{x}.$$

Solving, $$x=\frac{M(P_2-P_3)}{P_1-P_2}.$$

It will be understood that the applicant's methods will prove successful only if the defect to be located is the only defect in the cable section or is very much more serious than any other defect existing in the section.

While the applicant's methods have been described in detail above, it is to be understood that certain variations may be made which are in accordance with the spirit of the invention, the true scope of which is determined by the appended claims.

What is claimed is:

1. The method of locating a sheath defect in a section of cable which consists in plugging the cable at the ends of the section, introducing gas at one end of the plugged section without simultaneous introduction at the other end, maintaining the introduction pressure, permitting the gas pressure along the section to reach a steady state, and determining by computation or the equivalent the location of the defect from the pressure-distance relations along the cable section, on the premise of a constant pressure drop per unit of distance between the introduction point and the defect and zero pressure drop between the defect and the end of the section distant from said point.

2. The method of determining the location of a sheath defect in a section of cable which consists in plugging the cable on each side of the section, introducing gas at the first end of the section, permitting the gas pressure along the section to reach a steady state, measuring the pressures in the cable at the two ends of the section while the introduction pressure is maintained, introducing gas at the second end of the section, adjusting the pressure in the cable so that after a steady state has been reached the pressure at the first end equals that produced at the second end on the first introduction, measuring the pressure in the cable at the second end while the adjusted introduction pressure is maintained, and determining by computation or the equivalent the distance of the defect from an end of the section from the two known pressure drops and the known length of the section, on the premise of a constant pressure drop per unit of distance between the introduction point and the defect and zero pressure drop between the defect and the end of the section distant from said point.

3. The method of locating a sheath defect in a section of cable which consists in plugging the cable at the ends of the section, introducing gas at one end of the section without simultaneous introduction at the other end, permitting the gas pressure along the section to reach a steady state, measuring the pressure in the cable at two points on one side of the defect and one point on the other side thereof within the limits of the plugged section while the introduction pressure is maintained, and determining by computation or the equivalent the location of the defect from the three ascertained pressures and the known distances between the points of pressure measurement, on the premise of a constant pressure drop per unit of distance between the introduction point and the defect and zero pressure drop between the defect and the end of the section distant from said point.

4. The method of locating a sheath defect in a section of cable which consists in plugging the cable at the ends of the section, introducing gas at one end thereof without simultaneous introduction at the other end, permitting the gas pressure along the section to reach a steady state, measuring the pressure in the cable at the near end and at the distant end of the section and also at a point intermediate the near end and the defect while the introduction pressure is maintained, and determining by computation or the equivalent the location of the defect from the three ascertained pressures and the known distances between the points of pressure measurement, on the premise of a constant pressure drop per unit of distance between the introduction point and the defect and zero pressure drop between the defect and the end of the section distant from said point.

5. The method of determining the location of a sheath defect in a section of cable which consists in plugging the cable at the ends of the section, introducing gas at one end of the section without simultaneous introduction at the other end, permitting the gas pressure along the section to reach a steady state, measuring the gas pressure in the cable at the near end and at the distant end of the section and also at a point intermediate the near end and the defect while the introduction pressure is maintained, and determining by computation or the equivalent the distance between the intermediate point and the defect from the ascertained pressure drops between the near end and the intermediate point and between said point and the distant end and from the known distances between the near end and said intermediate point, on the premise of a constant pressure drop per unit of distance between the introduction point and the defect and zero pressure drop between the defect and the end of the section distant from said point.

THOMAS C. HENNEBERGER.